(12) United States Patent
Suzuki et al.

(10) Patent No.: US 7,460,322 B2
(45) Date of Patent: Dec. 2, 2008

(54) MAGNETIC TRANSFERRING APPARATUS

(75) Inventors: Hiroyuki Suzuki, Kawasaki (JP); Sumio Kuroda, Kawasaki (JP); Yutaka Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 11/390,693

(22) Filed: Mar. 28, 2006

(65) Prior Publication Data

US 2007/0177290 A1    Aug. 2, 2007

(30) Foreign Application Priority Data

Jan. 31, 2006    (JP)    ............................ 2006-022098

(51) Int. Cl.
     *G11B 5/86*    (2006.01)
(52) U.S. Cl. .......................................... 360/16; 360/17
(58) Field of Classification Search ........................ None
See application file for complete search history.

(56) References Cited

U.S. PATENT DOCUMENTS

2002/0150026 A1* 10/2002 Mahr et al. ................. 369/264
2003/0107983 A1* 6/2003 Kim et al. ................... 369/270
2006/0072227 A1* 4/2006 Aoki et al. ................... 360/17

FOREIGN PATENT DOCUMENTS

JP    2000-67433    3/2000

* cited by examiner

*Primary Examiner*—Joseph H Feild
*Assistant Examiner*—Daniell L Negrón
(74) *Attorney, Agent, or Firm*—Greer, Burns & Crain, Ltd.

(57) ABSTRACT

A magnetic transferring apparatus allows attachment of a first magnet to a first holder. A second magnet is attached to a second holder. The first and second holders are located in a space between first and second magnets. A magnetic disk and a master member are located in a space between the first and second holders. The magnetic attraction is generated between the first and second magnets. The magnetic attraction serves to bring the first and second holders closer to each other, so that magnetic pieces of the master member is brought in a close contact with the magnetic disk between the first and second holders. The magnetic flux runs between the first and second based on the contact between the magnetic pieces and the magnetic disk. A servo pattern can in this manner be established in the magnetic disk.

8 Claims, 5 Drawing Sheets

MAGNETIC TRANSFERRING APPARATUS

BACKGROUND OF THE INVENTION

1. Field of the Invention

The present invention relates to a magnetic transferring apparatus designed to establish a servo pattern on a magnetic disk usually incorporated in a magnetic storage apparatus such as a hard disk drive, HDD, for example.

2. Description of the Prior Art

A magnetic transferring apparatus is well known as disclosed in Japanese Patent Application Publication No. 2000-67433, for example. The magnetic transferring apparatus includes upper and lower flanges. The upper and lower flanges include master media, respectively. A magnetic disk is interposed between the master media. Air is then discharged from the space defined between the upper and lower flanges so as to establish a vacuum condition between the upper and lower flanges. A magnetic field of a magnet serves to establish a servo pattern on the magnetic disk.

A vacuum condition must be established between the upper and lower flanges so as to closely contact the master media against the magnetic disk in the magnetic transferring apparatus. A suction pump is often employed in the magnetic transferring apparatus so as to discharge air from the space between the upper and lower flanges. In addition, air passages must be formed in the flanges for connection of the space to the suction pump. The flanges are forced to have a complicated structure. The magnetic transferring apparatus suffers from an increased production cost.

SUMMARY OF THE INVENTION

It is accordingly an object of the present invention to provide a magnetic transferring apparatus capable of establishing a close contact of a master member with a magnetic disk with a simple structure.

According to the present invention, there is provided a magnetic transferring apparatus comprising: a first holding member designed to hold at least a magnetic disk; a master member including a magnetic piece superposed on the surface of the magnetic disk; a second holding member designed to hold the master member and the magnetic disk against the first holding member based on a movement relative to the first holding member; a first magnet attached to the first holding member; and a second magnet attached to the second holding member, said second magnet designed to hold the first and second holding members against the first magnet based on a magnetic reaction between the first and second magnets.

The magnetic transferring apparatus allows attachment of the first magnet to the first holding member. The first holding member is designed to hold a magnetic disk. The second magnet is attached to the second holding member. The first and second holding members are located in a space between the first and second magnets. The magnetic disk and the master member are located in a space between the first and second holding members. When a magnetic interaction is established between the first and second magnets, the magnetic attraction is generated between the first and second magnets. The magnetic attraction serves to bring the first and second holding members closer to each other, so that the master member is brought in a close contact with the magnetic disk between the first and second holding members. At the same time, the magnetic flux runs between the first and second magnets. The magnetic flux penetrates through the magnetic disk based on the contact between the magnetic piece and the magnetic disk. A servo pattern can in this manner be established in the magnetic disk. The first and second magnets serve to not only establish a servo pattern but also bring the master member in a close contact with the magnetic disk. The magnetic transferring apparatus is allowed to have a simplified structure for keeping the contact between the magnetic disk and the master member.

The first and second magnets may extend outward in the radial direction of the magnetic disk beyond the outer peripheries of the first and second holding members, respectively. Accordingly, the magnetic disk is allowed to reliably receive the magnetic flux uniformly over the entire front and back surfaces of the magnetic disk. The magnetic piece in the master member is allowed to contact with the magnetic disk uniformly over the surface of the magnetic disk. A magnetization can uniformly established over the entire magnetic disk. The servo pattern can reliably be established at an expected location with a higher accuracy.

The first and second magnets may be electromagnets, for example. The electromagnets generate a magnetic field in response to the supply of electric current. The first and second magnets are allowed to generate not only the magnetic attraction but also the magnetic repulsion based on the direction of the electric current. The magnetic repulsion serves to distance the first and second holding members from each other. The employment of the electromagnets contributes to realization of an automatic process of the magnetic transferring apparatus.

A specific method of establishing a magnetization in a magnetic disk may be realized in the aforementioned magnetic transferring apparatus. The method may comprising: holding a magnetic disk and a master member including a magnetic piece between a pair of magnets based on a magnetic attraction between the magnets; and establishing a magnetization in the magnetic disk based on a magnetic field of the magnetic attraction. The magnets may be an electromagnet, respectively. The method may further comprise supplying electric current to the electromagnets so as to generate the magnetic attraction between the electromagnets. The method may further comprise reversing the electric current so as to generate a magnetic repulsion between the electromagnets. In this case, the magnetic piece is brought into a close contact with the magnetic disk with the assistance of the magnetic attraction.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
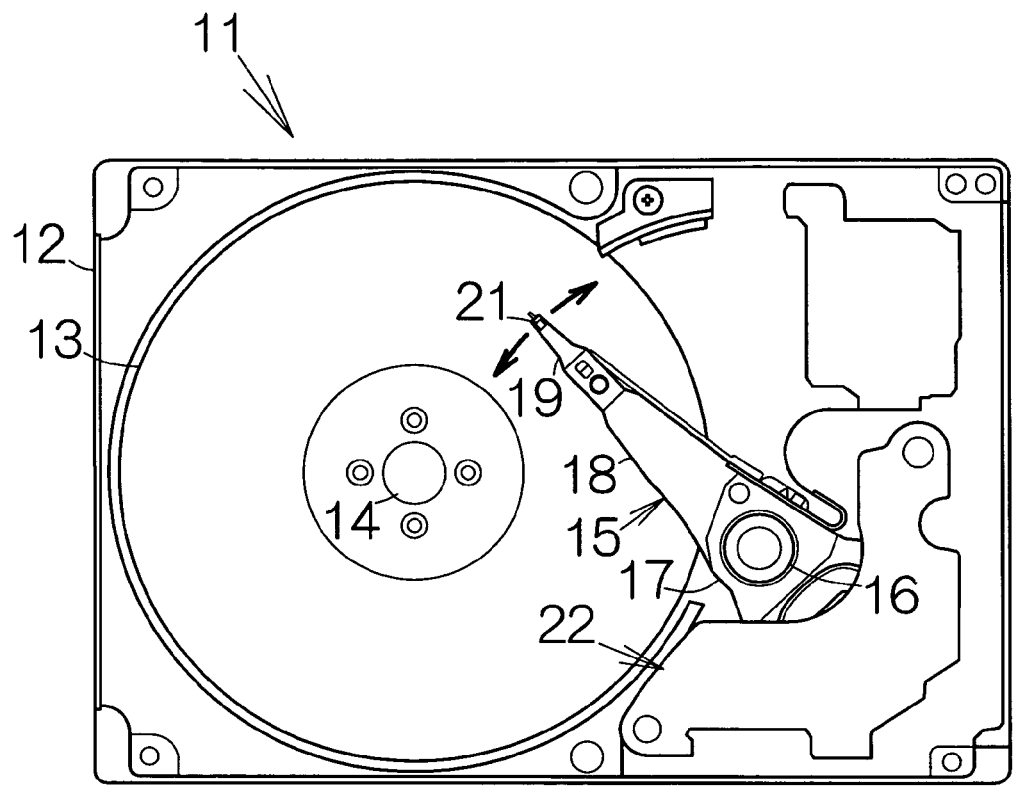
FIG. 1 is a plan view schematically illustrating a hard disk drive as an example of a magnetic recording medium according to the present invention.

FIG. 1 schematically illustrates the inner structure of a hard disk drive, HDD, 11 as a specific example of a recoding medium drive according to an embodiment of the present invention. The hard disk drive 11 includes a box-shaped main enclosure 12 defining an inner space of a flat parallelepiped opened upward, for example. At least one magnetic recording disk 13 is incorporated in the inner space within the main enclosure 12. The magnetic recording disk or disks 13 are mounted on the driving shaft of a spindle motor 14. The spindle motor 14 is allowed to drive the magnetic recording disk or disks 13 for rotation at a higher revolution speed such as 7,200 rpm or 10,000 rpm, for example. A cover, not shown, is coupled to the main enclosure 12. The cover serves to airtightly close the opening of the main enclosure 12.

A carriage 15 is also incorporated within the inner space of the main enclosure 12. The carriage 15 includes a carriage block 17 supported on a vertical support shaft 16 for rotation. Rigid carriage arms 18 are defined in the carriage block 17. The carriage arms 18 are designed to extend in a horizontal direction from the vertical support shaft 16. The carriage arms 18 are associated with the front and back surfaces of the magnetic recording disk or disks 17, respectively. The carriage block 17 may be made of aluminum. Molding process may be employed to form the carriage block 17.

Elastic head suspensions 19 are fixed to the tip ends of the carriage arms 18. The individual head suspension 19 is designed to extend forward from the corresponding tip end of the carriage arm 18. As conventionally known, a flying head slider 21 is supported on the front end of the individual head suspension 19. The flying head slider 21 is in this manner related to the carriage block 17. The flying head sliders 26 are opposed to the surfaces of the magnetic recording disk or disks 13. In the case where two or more of the magnetic recording disks 13 are mounted within the main enclosure 12, a pair of carriage arms 18, namely the head suspensions 19 are located between the adjacent ones of the magnetic recording disks 13.

A magnetic head or read/write electromagnetic transducer, not shown, is mounted on the flying head slider 21. The read/write electromagnetic transducer includes, for example, a read element and a write element. The read element may include a giant magnetoresistive (GMR) element or a tunnel-junction magnetoresistive (TMR) element designed to utilize a variation in the electric resistance of a spin valve film or tunnel-junction film so as to discriminate magnetic bit data on the magnetic recording disk 13. The write element may include a thin film magnetic head designed to utilize a magnetic field, generated at a thin film coil pattern, so as to record magnetic bit data into the magnetic recording disk 13.

The head suspension 19 serves to urge the flying head slider 21 toward the surface of the magnetic recording disk 13. When the magnetic recording disk 13 rotates, the flying head slider 21 is allowed to receive an airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force of the head suspension 19.

A power source such as a voice coil motor, VCM, 22 is connected to the carriage block 17. The voice coil motor 22 drives the carriage block 17 for rotation around the support shaft 16. The rotation of the carriage block 17 induces the swinging movement of the carriage arms 18 and the head suspensions 19. When the carriage arm 18 is driven to swing about the support shaft 16 during the flight of the flying head slider 21, the flying head slider 21 is allowed to cross the recording tracks defined on the magnetic recording disk 13 in the radial direction of the magnetic recording disk 13.

Figure 2:
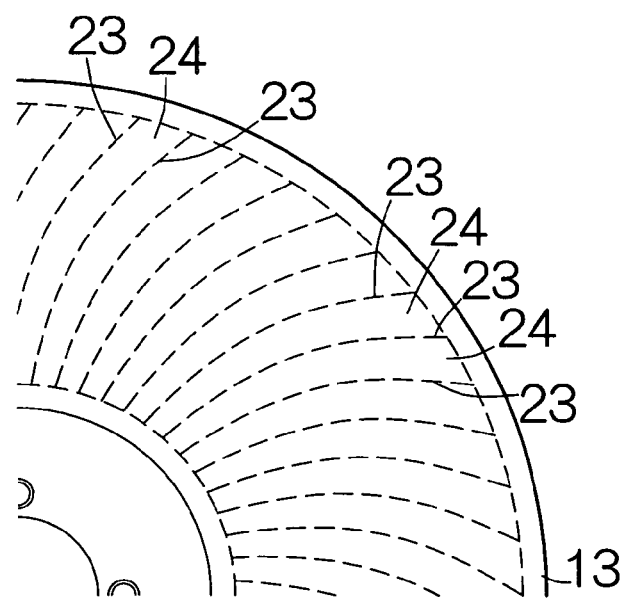
FIG. 2 is an enlarged partial plan view of a magnetic recording disk or magnetic recording medium.

As shown in FIG. 2, stripes of bent servo sector regions 23, for example, sixty of those, are defined on the front and back surfaces of the magnetic recording disk 13, respectively. The individual servo sector regions 23 are designed to extend in the radial direction of the magnetic recording disk 13. Predetermined servo patterns are established in the servo sector regions 23. The read/write electromagnetic transducer on the flying head slider 21 is allowed to extract magnetic information out of the servo patterns. The extracted magnetic information is utilized to position the flying head slider 21 in the radial direction of the magnetic recording disk 13. The curvature of the servo sector region 23 is determined based on the path of movement of the read/write electromagnetic transducer.

Data storage regions 24 are established between the adjacent servo sector regions 23 for holding magnetic information or binary data. When the flying head slider 21 is positioned in the radial direction of the rotating magnetic recording disk 13, the read/write electromagnetic transducer on the flying head slider 21 is allowed to keep tracking a target recording track. The write element of the read/write electromagnetic transducer operates to establish a magnetic bit data over the data storage region 24 along the recording track. Likewise, the read element of the read/write electromagnetic transducer operates to read a string of bit data out of the data storage region 24 along the recording track.

Figure 3:
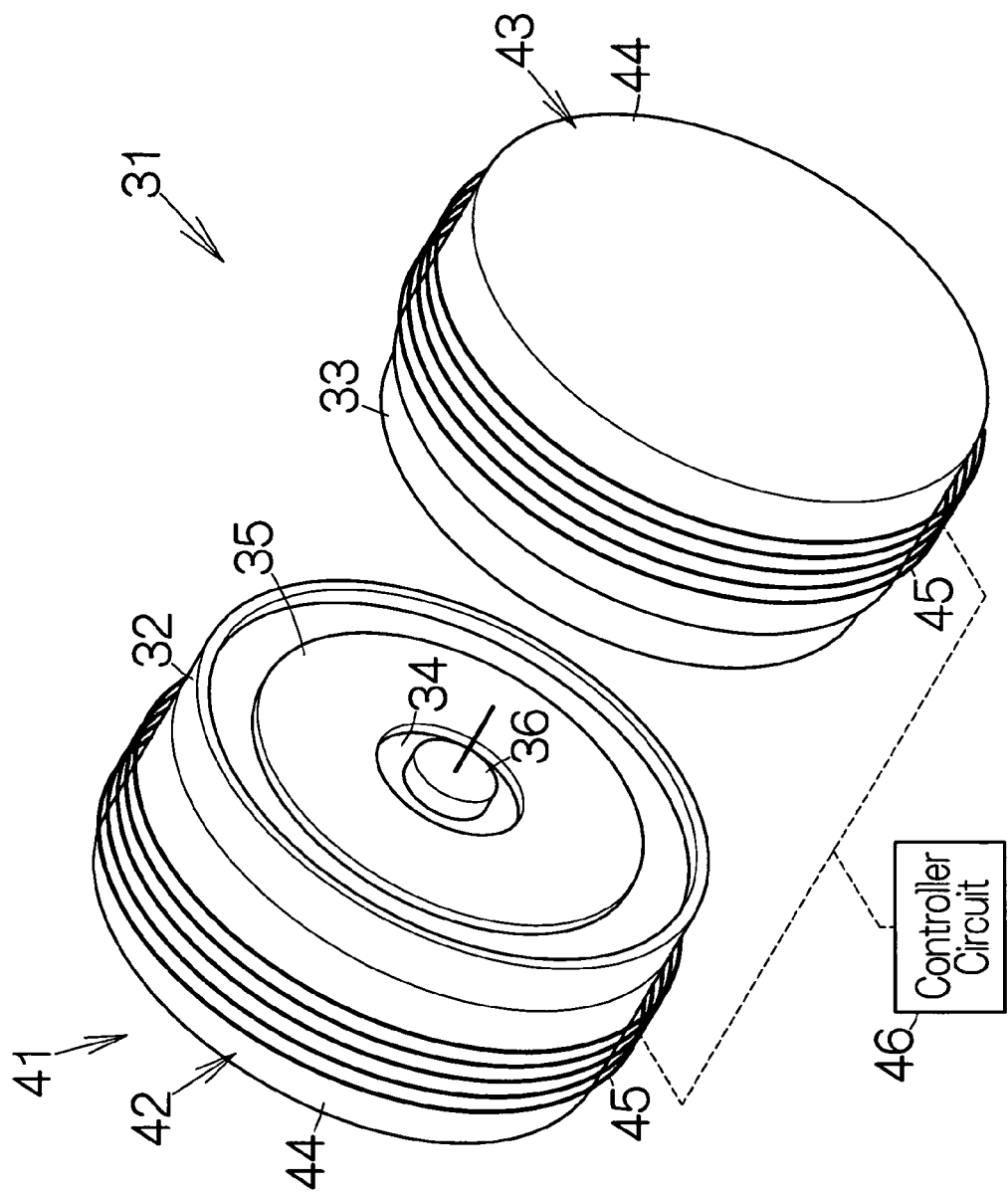
FIG. 3 is a perspective view schematically illustrating the structure of a magnetic transferring apparatus according to a specific embodiment of the present invention.

FIG. 3 schematically illustrates a magnetic transferring apparatus 31 utilized to establish the servo pattern on the magnetic recording disk 13. The magnetic transferring apparatus 31 includes disk-shaped first and second holders 32, 33 respectively having the inward surfaces opposed to each other, for example. The inward surfaces of the first and second holders 32, 33 may be defined within parallel planes perpendicular to the floor, for example. The first and second holders 32, 33 may be made of a non-magnetic material.

A receiving shaft 34 is defined on the inward surface of the first holder 32. A first master member 35 is mounted on the receiving shaft 34. The first master member 35 includes a non-magnetic body and magnetic piece embedded in the surface of the non-magnetic body. The location or arrangement of the magnetic pieces reflects a servo pattern to be established on the surface of a magnetic recording disk. Here, the arrangement of the magnetic pieces should reflect the servo pattern established in the servo sector regions 23 on the back surface of the magnetic recording disk 13.

A smaller receiving shaft 36 is formed on the receiving shaft 34. The smaller receiving shaft 36 is set coaxial to the receiving shaft 34. The smaller receiving shaft 36 may be made of a soft magnetic material, for example. A magnetic disk, not shown, is mounted on the smaller receiving shaft 36, as described later. The first master member 35 is designed to receive the back surface of a magnetic disk.

Figure 4:
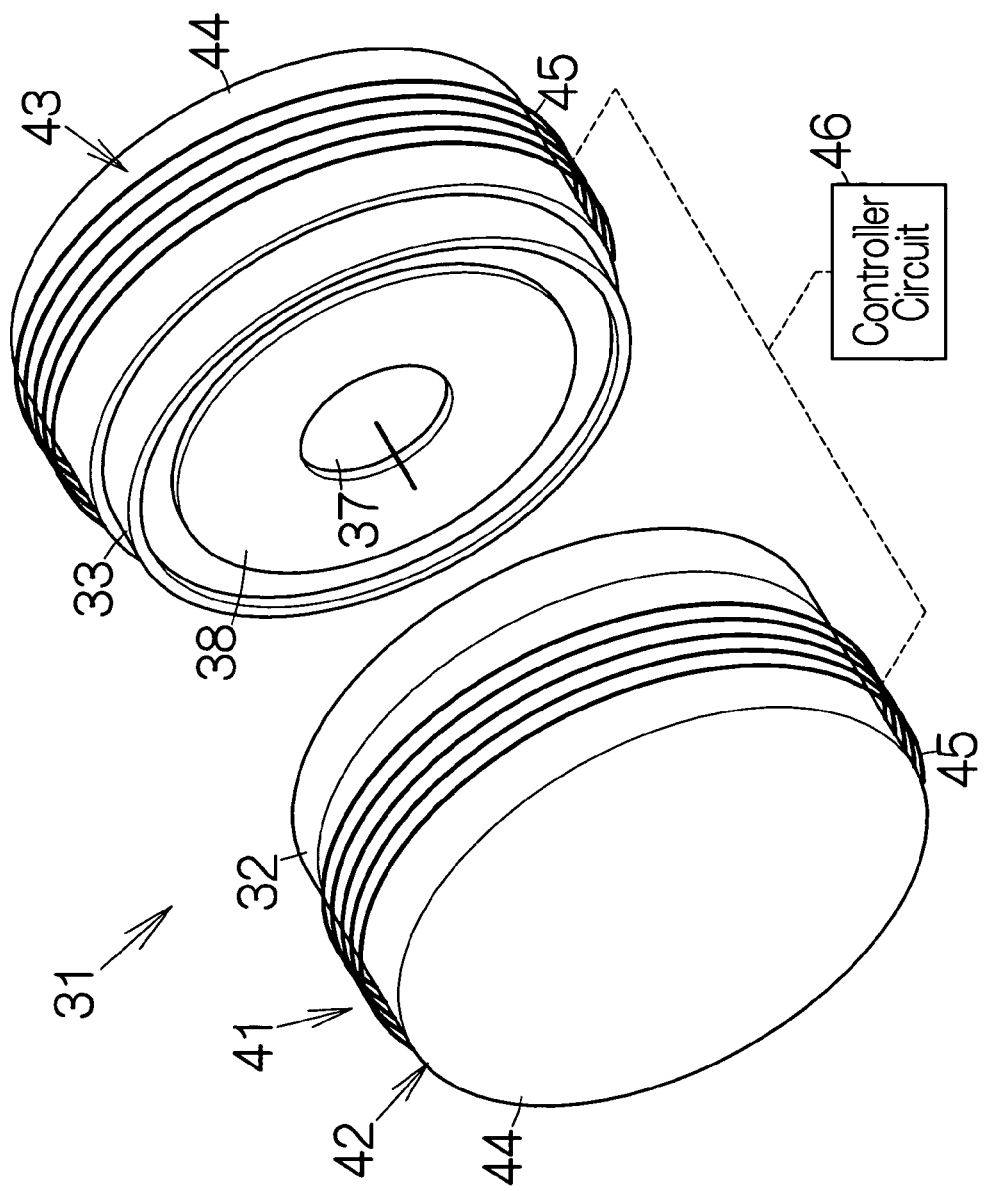
FIG. 4 is a perspective view schematically illustrating the magnetic transferring apparatus from a different view point.

Referring also to FIG. 4, a receiving shaft 37 is likewise defined on the inward surface of the second holder 33. A second master member 38 is mounted on the receiving shaft 37. The second master member 38 is set opposed to the first master member 35. The receiving shaft 38 of the second holder 33 is set coaxial to the receiving shaft 34 of the first holder 32. The diameter of the second master member 38 may be set equal to that of the first master member 35.

The second master member 38 includes a non-magnetic body and magnetic pieces embedded in the surface of the non-magnetic body in the same manner as the first master member 35. The location or arrangement of the magnetic pieces reflects a servo pattern to be established on the surface of a magnetic recording disk. Here, the arrangement of the magnetic pieces should reflect the servo pattern established in the servo sector regions 23 on the front surface of the magnetic recording disk 13.

A magnetizing mechanism 41 is related to the first and second holders 32, 33. The magnetizing mechanism 41 includes first and second electromagnets 42, 43 generating a magnetic field in response to the supply of electric current. The first electromagnet 42 is attached to the outward surface of the first holder 32. The second electromagnet 43 is attached to the outward surface of the second holder 33. The first and second electromagnets 42, 43 respectively include a magnetic core 44 and a coil 45 wound around the magnetic core 44. Here, the magnetic flux penetrates through the space between the first and second electromagnets 42, 43. The magnetic flux forms a magnetic field between the first and second electromagnets 42, 43.

A controller circuit 46 is connected to the magnetizing mechanism 41. The controller circuit 46 is allowed to control the direction and magnitude of the electric currents supplied to the first and second electromagnets 42, 43, respectively. The controller circuit 46 operates in accordance with a predetermined software program. The direction of the electric current supplied to the first and second electromagnets 42, 43 determines the direction of the magnetic flux penetrating through the first and second electromagnets 42, 43.

The first holder 32 and the first electromagnet 42 are stationarily mounted on a predetermined support in the magnetic transferring apparatus 31. On the other hand, the second holder 33 and the second electromagnet 43 are allowed to move relative to the first holder 32 and the first electromagnet 42. The second holder 33 is allowed to move in the longitudinal direction along the longitudinal axis of the receiving shaft 37. A guiding rail, not shown, may be employed to guide the movement of the second holder 33, for example.

Here, the second holder 33 is allowed to shift between a standby position and a lock position. A predetermined interval is established between the first and second holders 32, 33 when the second holder 33 takes the standby position. In this case, a magnetic disk can be mounted on the smaller receiving shaft 36 on the first holder 32 through the space between the first and second holders 32, 33. The forward movement of the second holder 33 and the second electromagnet 43 toward the first holder 32 from the standby position causes the second holder 33 to reach the lock position. The second holder 33 at the lock position couples with the first holder 32. The first and second master members 35, 38 hold a magnetic disk therebetween inside the first and second holders 32, 33.

Figure 5:
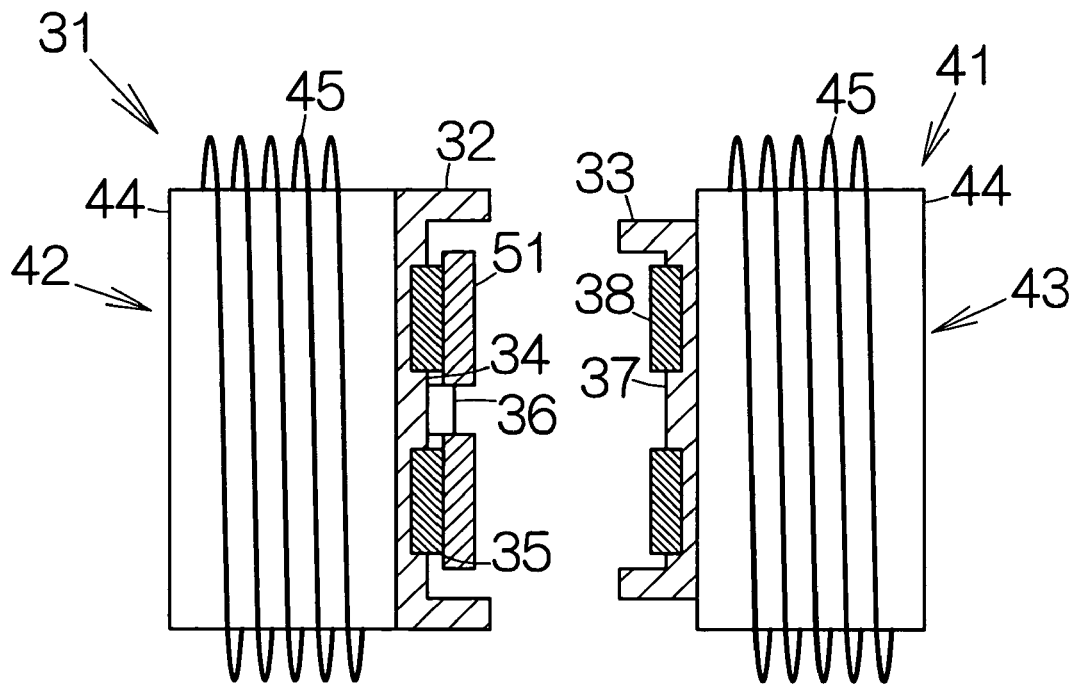
FIG. 5 is a vertical sectional view schematically illustrating a part of the magnetic transferring apparatus.

Now, assume that a servo pattern is to be written into a magnetic disk. As shown in FIG. 5, a magnetic disk 51 is first mounted on the smaller receiving shaft 36 of the first holder 32 after initialization. The back surface of the magnetic disk 51 is brought into contact with the surface of the first master member 35. The first and second holders 32, 33 extend in the radial direction of the magnetic disk 51 beyond the outer periphery of the magnetic disk 51. The first and second electromagnets 42, 43 likewise extend in the radial direction of the magnetic disk 51 beyond the outer periphery of the magnetic disk 51. A magnetization is uniformly established in the magnetic disk 51 all over the front and back surfaces of the magnetic disk 51 during the initialization. The magnetization is set to run from the front surface to the back surface in the direction perpendicular to the front and back surfaces of the magnetic disk 51.

Figure 6:
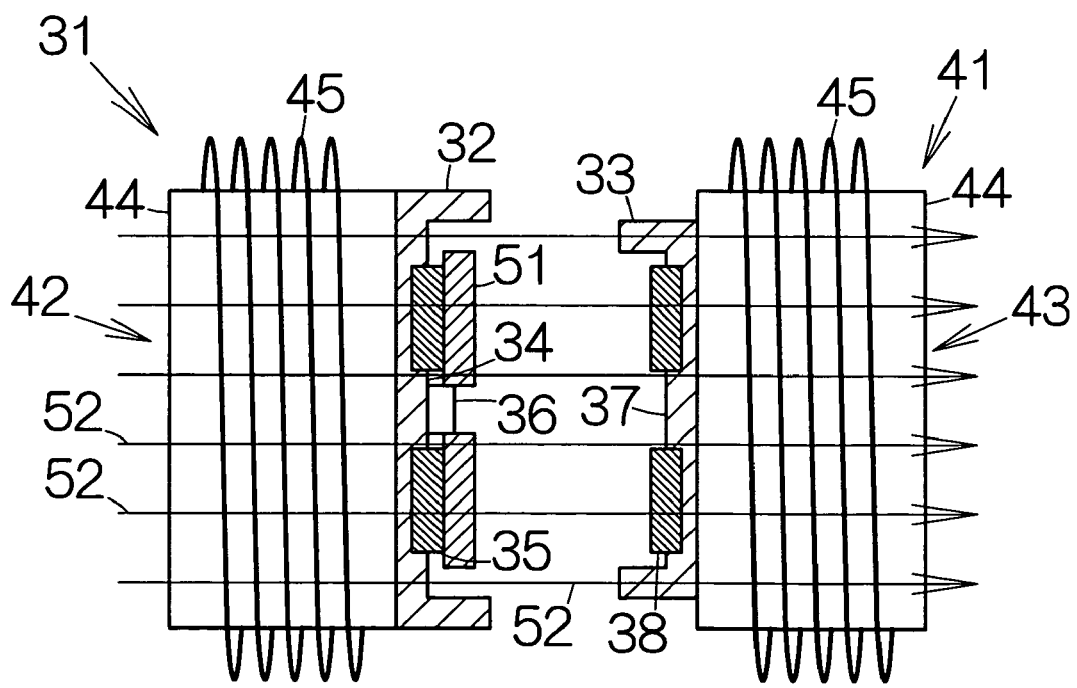
FIG. 6 is a vertical sectional view, corresponding to FIG. 5, schematically illustrating a magnetic flux established between first and second holders.

The controller circuit 46 then starts supplying electric current to the first and second electromagnets 42, 43. The first and second electromagnets 42, 43 are thus allowed to generate a magnetic flux 52 from the first electromagnet 42 to the second electromagnet 43 in response to the supply of the electric current, as shown in FIG. 6, for example. The magnetic attraction is induced between the first and second electromagnets 42, 43. The second electromagnet 43 and the second holder 33 move forward toward the lock position from the standby position. The guiding rail serves to guide the forward movement of the second electromagnet 43 in this case. The first and second electromagnets 42, 43 keep receiving the electric current, so that the magnetic attraction is maintained between the first and second electromagnets 42, 43.

Figure 7:
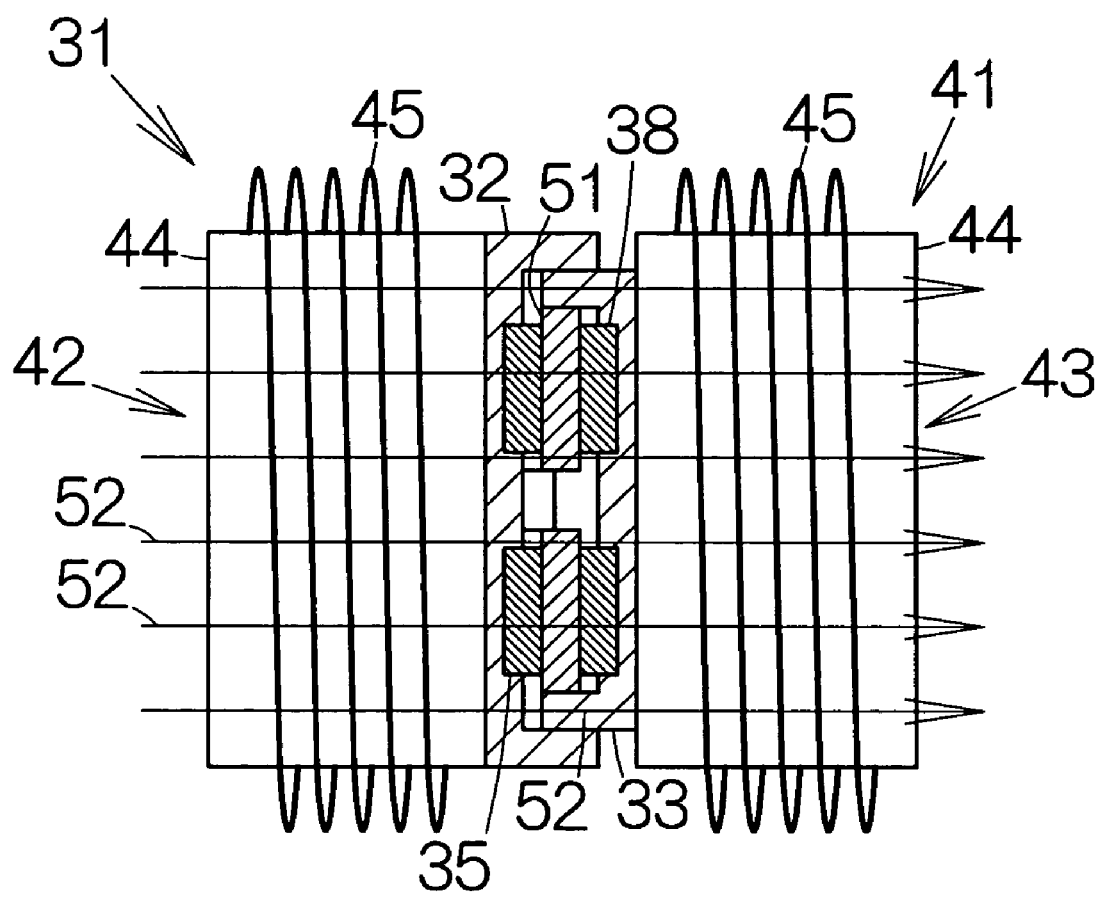
FIG. 7 is a vertical sectional view, corresponding to FIG. 5, schematically illustrating the second holder coupled to the first holder.

As shown in FIG. 7, the second holder 33 is in this manner positioned at the lock position. Since the magnetic attraction is kept between the first and second electromagnets 42, 43, the first master member 35 keeps closely contacting with the back surface of the magnetic disk 51. The magnetic pieces of the first master member 35 is brought in a close contact with the back surface of the magnetic disk 51. The magnetic flux 52 penetrates through the magnetic disk 51 based on the contact between the magnetic pieces and the back surface of the magnetic disk 51. The magnetic flux 52 serves to overwrite the magnetization in the magnetic disk 51. The magnetization is in this manner reversed in the magnetic disk 51 over a specific area.

Likewise, the magnetic attraction between the first and second electromagnets 42, 43 serves to keep the second master member 38 in contact with the front surface of the magnetic disk 51. The magnetic pieces of the second master member 38 is thus brought into a close contact with the front surface of the magnetic disk 51. Here, the magnetic flux 52 serves to overwrite the magnetization in the magnetic disk 51 based on the contact between the magnetic pieces and the front surface of the magnetic disk 51. The magnetization is in this manner reversed in the magnetic disk 51 over a specific area. The servo pattern is established over the front and back surface of the magnetic disk 51.

The supply of the electric current is thereafter terminated. The magnetic attraction thus disappears between the first and second electromagnets 42, 43. The second holder 33 is then driven to the standby position from the lock position. The magnetic disk 51 is removed. Here, electric current may be supplied to the first and second electromagnets 42, 43 in the reverse direction opposite to the aforementioned direction. This type of the electric current causes generation of the magnetic repulsion between the first and second electromagnets 42, 43. The magnetic repulsion serves to drive the second holder 33 away from the first holder 32 to the standby position. Another magnetic disk 51 can then be mounted on the smaller receiving shaft 36. The new magnetic disk 51 can be subjected to the aforementioned processes.

The magnetic transferring apparatus 31 allows generation of the magnetic attraction between the first and second electromagnets 42, 43 in response to the supply of electric current. The magnetic attraction serves to establish a close contact between the magnetic disk 51 and the first and second master members 35, 38. The magnetic disk 51 is brought into a close contact with the master members 35, 38 with a simplified structure. At the same time, the magnetic flux is induced between the first and second electromagnets 42, 43. The magnetic flux 52 penetrates through the magnetic disk 51 over a specific area corresponding to the contact of the magnetic pieces with the magnetic disk 51. A servo pattern is in this manner established in the magnetic disk 51. This magnetic flux 52 also serves to keep the master members 35, 38 in contact with the magnetic disk 51 during the establishment of the servo pattern. The first and second electromagnets 42, 43 serve to not only write the servo pattern but also keep the contact between the magnetic disk 51 and the master members 35, 38. The magnetic transferring apparatus 31 is allowed to have a simplified structure.

In addition, the first and second holders 32, 33 and the first and second electromagnets 42, 43 extend beyond the outer periphery of the magnetic disk 51 in the radial direction of the magnetic disk 51. Accordingly, the magnetic disk 51 is allowed to reliably receive the magnetic flux uniformly over the entire front and back surfaces. The first and second master members 35, 38 are allowed to bring the magnetic pieces in contact with the magnetic disk 51 uniformly over the entire front and back surfaces of the magnetic disk 51. A uniform magnetization can be established over the entire magnetic disk 51. The servo pattern can reliably be established at expected locations with a higher accuracy.

Here, the controller circuit 46 may set the minimum amount of electric current during the forward movement of the second holder 33 from the standby position to the lock position. The minimum magnetic attraction is thus established between the first and second electromagnets 42, 43 during the forward movement of the second holder 33. The second holder 33 moderately moves. The second master member 38 is thus prevented from colliding against the magnetic disk 51 with a larger impact. When the second holder 33 has reached the lock position, the controller circuit 46 may serve to increase the amount of electric current supplied to the first and second electromagnets 42, 43. Alternatively, the first and second electromagnets 42, 43 may be replaced with permanent magnets.

The magnetic transferring apparatus 31 may be employed to initialize a magnetic disk, for example. In this case, the first and second master members 35, 38 are removed from the magnetic transferring apparatus 31. The magnetic flux is induced between the first and second electromagnets 42, 43 in response to the supply of electric current. The magnetic flux may be set to run from the first electromagnet 42 to the second electromagnet 43. The magnetic flux can be utilized to initialize the magnetic disk. A uniform magnetization is established in the initialized magnetic disk all over the magnetic disk.

What is claimed is:

1. A magnetic transferring apparatus comprising:
   a first holding member designed to hold at least a magnetic disk;
   a master member including a magnetic piece superposed on a surface of the magnetic disk;
   a second holding member designed to hold the master member and the magnetic disk against the first holding member based on a movement relative to the first holding member;
   a first magnet attached to the first holding member; and
   a second magnet attached to the second holding member, said second magnet designed to hold the first and second holding members against the first magnet based on a magnetic reaction between the first and second magnets.

2. The magnetic transferring apparatus according to claim 1, wherein said first and second magnets extend outward in a radial direction of the magnetic disk beyond an outer periphery of the magnetic disk.

3. The magnetic transferring apparatus according to claim 1, wherein said first and second magnets are electromagnets.

4. A magnetic transferring apparatus comprising:
   a first holding member;
   a second holding member designed to move relative to the first holding member;
   a non-magnetic body located between the first and second holding members;
   magnetic pieces embedded in a surface of the non-magnetic body; and
   magnets generating a magnetic attraction between the first and second holding members for driving the second holding member toward the first holding member, said magnets extending outward in a radial direction beyond a circle reflecting an outer periphery of a magnetic disk.

5. A method of establishing a magnetization in a magnetic disk, comprising:
   holding a magnetic disk and a master member including a magnetic piece between a pair of magnets based on a magnetic attraction between the magnets; and
   establishing a magnetization in the magnetic disk based on a magnetic field of the magnetic attraction.

6. The method according to claim 5, further comprising supplying electric current to electromagnets as the magnets so as to generate the magnetic attraction between the electromagnets.

7. The method according to claim 6, further comprising reversing the electric current so as to generate a magnetic repulsion between the electromagnets.

8. The method according to claim 5, wherein the magnetic piece is brought into a close contact with the magnetic disk with the assistance of the magnetic attraction.

* * * * *